United States Patent

[11] 3,617,487

[72] Inventor Joseph Jaffe
Berkeley, Calif.
[21] Appl. No. 883,590
[22] Filed Dec. 9, 1969
[45] Patented Nov. 2, 1971
[73] Assignee Chevron Research Company
San Francisco, Calif.
Continuation-in-part of application Ser. No. 749,836, Aug. 2, 1968, now abandoned.

[54] JET FUEL PRODUCTION
7 Claims, No Drawings
[52] U.S. Cl. ................................... 208/59,
208/111, 252/455 Z
[51] Int. Cl. ....................................... C10g 37/02,
B01j 11/22, C101 1/04
[50] Field of Search ........................... 208/59, 60,
111, 120

[56] References Cited
UNITED STATES PATENTS
3,132,087 5/1964 Kelley et al. ............... 208/60
3,140,253 7/1964 Plank et al. ................ 208/120

Primary Examiner—Delbert E. Gantz
Assistant Examiner—G. E. Schmitkons
Attorneys—A. L. Snow, Frank E. Johnston, George F. Magdeburger, Charles J. Tonkin and T. G. De Jonghe ABSTRACT: The disclosure relates to a process for producing jet fuel from a hydrocarbon feedstock boiling at least partly above the jet fuel range, which comprises:

a. Contacting the feedstock in a first zone, at elevated temperature and pressure and in the presence of hydrogen, with a catalyst comprising a crystalline zeolitic molecular sieve dispersed in a nonzeolitic hydrocracking catalyst matrix;

b. Operating the first zone at conditions to obtain between 10 and 35 percent conversion of the feedstock to material boiling in the jet fuel range and withdrawing a first zone effluent comprising partially converted feedstock;

c. Passing at least a portion of the first zone effluent from the first zone to a second zone;

d. Contacting said portion of the first zone effluent in the second zone, at elevated temperature and pressure and in the presence of hydrogen, with an amorphous catalyst comprising metals or compounds of metals selected from Group VI or VIII or both of these groups, and a siliceous cracking component; and e. Operating the second zone at conditions to obtain between 10 and 45 percent conversion of said portion of the first zone effluent to material boiling in the jet fuel range.

Preferably, the first and second zones are contained in one common reactor vessel.

3,617,487

JET FUEL PRODUCTION

CROSS-REFERENCE

This patent application is a continuation-in-part of my application Ser. No. 749,836, filed Aug. 2, 1968 (now abandoned).

BACKGROUND OF THE INVENTION

The present invention relates to a hydrocracking process for converting heavier than jet fuel feedstocks, that is, vacuum gas oils, atmospheric gas oils, etc., to high yields of jet-fuel-boiling range hydrocarbons. More particularly, the present invention relates to hydrocracking, using two different types of catalyst, to produce a jet fuel from a gas oil feedstock.

Hydrocracking operations have been proposed in which there is employed a catalyst comprising one or more components exhibiting hydrocracking activity, such as the metals of Group VI or Group VIII of the Periodic Table, in an elemental form or in the form of oxides or sulfides thereof, composited with a siliceous cracking component. Hydrocracking operations, using a crystalline zeolitic molecular sieve component associated with other catalyst components has also been proposed. The present invention is directed to a novel process which employs catalysts of both of the above types, that is, nonzeolitic hydrocracking catalysts and zeolitic hydrocracking catalysts.

Hydrocracking, also commonly referred to as "destructive hydrogenation," is distinguished from the simple addition of hydrogen to unsaturated bonds between carbon atoms, since it effects definite changes in the molecular structure of the hydrocarbons being processed. Hydrocracking may, therefore, be designated as cracking under hydrogenation conditions such that the lower-boiling products of the cracking reactions are substantially more saturated than when hydrogen, or material supplying the same, is not present. Although many hydrocracking processes, or destructive hydrogenation processes, are conducted thermally, the preferred processing technique involves the utilization of a catalytic composite possessing a high degree of hydrocracking activity. In virtually all hydrocracking processes, whether thermal or catalytic, controlled or selective cracking is desirable from the standpoint of producing an increased yield of the desired liquid product.

Selective hydrocracking is especially important when processing hydrocarbons and mixtures of hydrocarbons which boil at temperatures above the middle-distillate boiling range, that is, the hydrocarbons and mixtures of hydrocarbons, as well as the various hydrocarbon fractions and distillates, having an initial boiling point of from about 400° F. to 600° F. and an end boiling point as high as 900° F., or more. Selective hydrocracking of such hydrocarbon fractions results in greater yield of hydrocarbons boiling within and below the middle-distillate boiling range. In addition, selective hydrocracking of such heavier hydrocarbon fractions results in a substantially increased yield of jet fuel boiling range hydrocarbons, that is, those hydrocarbons and hydrocarbon fractions boiling within the range of about 250° F. to about 550° F.

In the present invention, the term "selective hydrocracking" is used particularly to connote hydrocracking a gas oil to selectively produce hydrocarbons boiling in the jet fuel range, as opposed to hydrocarbons boiling below the jet fuel range, such as gasoline, and normally gaseous hydrocarbons.

Processes have been disclosed for producing jet fuel using different catalysts contained in two or more reaction zones. There are a large number of references in the literature which disclose hydrofining ahead of hydrocracking in various process embodiments. In these operations involving hydrofining prior to hydrocracking, there is usually very little cracking in the hydrofining stage other than that cracking incidental to the removal of such contaminants as organically bound sulfur and nitrogen, which contaminants are usually harmful in the hydrocracking process. U.S. Pat No. 3,132,087 discloses a process for producing gasoline and jet fuel by multistage hydrofining and hydrocracking. According to the process in that patent, a gas oil is hydrofined and then subjected to catalytic hydrocracking in two successive hydrocracking zones. Catalysts containing crystalline zeolites are indicated as preferred for use in both of the hydrocracking stages. Because of the substantial amount of cracking in the two successive hydrocracking stages, the process of U.S. Pat. No. 3,132,087 produces substantial amounts of gasoline and other hydrocarbons boiling below the jet fuel range.

U.S. Pat. No. 3,287,252 discloses a process for producing gasoline by catalytically hydrocracking a hydrocarbon feedstock using an amorphous hydrocracking catalyst and a crystalline zeolitic molecular sieve hydrocracking catalyst. According to the disclosure of that patent, the amorphous hydrocracking catalyst is preferably used in a hydrocracking zone ahead of the hydrocracking zone containing the molecular sieve catalyst. The molecular sieve catalyst disclosed in U.S. Pat. No. 3,287,252 is a pure sieve catalyst; it is not dispersed in a gel matrix of hydrocracking catalyst.

SUMMARY OF THE INVENTION

According to the present invention, a process is provided for producing jet fuel, which comprises:

a. Contacting the feedstock in a first zone, at elevated temperature and pressure and in the presence of hydrogen, with a catalyst comprising a crystalline zeolitic molecular sieve dispersed in a nonzeolitic hydrocracking catalyst matrix;

b. Operating the first zone at conditions to obtain between 10 and 35 percent conversion of the feedstock to material boiling below the initial boiling point of the feedstock and above 300° F. and withdrawing an effluent comprising partially converted feedstock;

c. Passing at least a portion of the first zone effluent from the first zone to a second zone;

d. Contacting said portion of the first zone effluent in the second zone, at elevated temperature and pressure and in the presence of hydrogen, with an amorphous catalyst comprising metals or compounds of metals selected from Group VI or VIII or both of these groups, and a cracking component; and e. Operating the second zone at conditions to obtain between 10 and 45 percent conversion of said portion of the first zone effluent to material boiling below the initial boiling point of the feedstock and above 300° F.

The term "zeolite" or "zeolitic material" is used herein to mean crystalline zeolitic aluminosilicates. The zeolitic material contained in the catalyst used in the first zone of the present invention can be of any type that is known to the art as a useful catalyst or catalyst component for catalytic hydrocracking. These include faujasite, particularly Y-type and X-type faujasite, and mordenite. The zeolitic material of the first zone catalyst is dispersed in a nonzeolitic hydrocracking catalyst matrix. The nonzeolitic hydrocracking catalyst matrix may comprise any component having measurable catalytic hydrogenation activity, including, for example, Group VI and VIII elements, silica, and alumina. Preferably the zeolitic material is dispersed in a cogel matrix of Group VI (particularly Mo or W) and Group VIII (particularly Ni or Co) metals or metal compounds, silica, and alumina.

The amorphous catalysts used in the second zone lack the crystalline structure of the zeolite contained in the first zone catalyst and typically have larger pore channels. Usually the zeolitic material used in the catalyst in the first zone has pore sizes of the order of 5 to 15A whereas the amorphous catalyst in the second zone generally has pore sizes of the order of 30 to 100A. Preferably the amorphous catalyst used in the second zone contains both Group VI (particularly Mo and W) and Group VIII (particularly Ni or Co) elements together with a siliceous cracking support (e.g., a support comprising silica and alumina), as these type catalyst formulations have been found to be good for hydrocracking heavy oils to form jet fuel. It is strongly preferred that the second zone catalyst be prepared by cogelation techniques, as catalysts with enhanced stability which are highly selective for hydrocracking heavy oils to form jet fuel are attained by cogel preparation. Although the amorphous hydrocracking catalyst in the second zone can be composed of a wide variety of hydrogenation components on a cracking support, as, for example, nickel on fluorided alumina, it is strongly preferred to use a siliceous (i.e., silica containing) cracking support or component in the process of the present invention. Other cracking supports include zirconia, titania, acidified silica or alumina (e.g., fluorided alumina or alumina-containing chloride), etc.

We have found by experimental work that the process of the present invention is very advantageous for selectively producing high jet fuel yields from a gas oil feedstock. Although the scope of the invention is not to be restricted to any theory of operation, it is believed that the advantage of operating in accordance with the present invention is largely due to the high stability of the zeolitic catalyst, coupled with the high selectivity of the second zone catalyst for producing jet fuel and the somewhat lower stability of the second zone catalyst versus the zeolitic catalyst. The zeolitic catalyst is very stable (that is, it has a very low fouling rate in this service) and has a high activity for hydrocracking hydrocarbons but, due to its small pore channels, it will tend form high yields of products boiling below the jet fuel range if the zeolitic catalyst is used at operating conditions of space velocity, temperature and pressure to obtain more than about 35 percent conversion of material boiling above the jet fuel range. Nonzeolitic catalyst, that is, the second zone amorphous catalyst containing Group VI and/or Group VIII elements, in addition to a cracking support or component, particularly cogel catalysts with enhanced stability, can be made to result in very high jet fuel yields from a gas oil feedstock but the amorphous catalyst is nevertheless usually less stable than the zeolitic catalyst. The nonzeolitic catalyst used in the process of the present invention also distinguishes from the zeolitic catalyst in that the nonzeolitic catalyst does not impose as severe a cracking reaction as the zeolitic catalyst and is more selective for cracking the gas oil feedstock to jet fuel boiling range hydrocarbons, as opposed to cracking to material boiling below the jet fuel range. Thus, it is believed that the two catalysts complement one another to achieve a low fouling rate, high selectivity process for producing jet fuel.

It is to be noted that the present invention is directed to selectively producing jet fuel. Conversions referred to herein are to material boiling below the initial boiling point of the hydrocarbon feedstock, and yields used herein are with respect to the amount of the hydrocarbon feedstock converted to hydrocarbons boiling within the jet fuel range. In the process of the present invention, overall yields of jet fuel of about 40 to 80 percent of the feed are attained.

It is important to note that the first zone of the present invention is operated at a conversion less than 35 liquid volume percent. It has been determined that conversion above about 35 liquid volume percent for the first zone is not desired in the overall process of the present invention. Instead, the present invention requires that the first zone be operated at conditions of space velocity, temperature and pressure to obtain between 10 and 35 percent conversion and that the second zone be operated at conditions to obtain an additional conversion between 10 and 45 percent. Thus the first zone does not function simply as a hydrofining zone but instead does substantial hydrocracking to form jet fuel boiling range hydrocarbons while operating under conditions to avoid "overcracking" to hydrocarbons boiling below the jet fuel range.

The amount of catalyst used in the first zone should be from 10 to 90 volume percent of the total catalyst used in the first and second zones. Usually it is preferred to use from 10 to 50 volumes of zeolite containing catalyst in the first zone, versus 90 to 50 volumes of amorphous hydrocracking catalyst in the second zone in order to obtain between 10 and 35 volume percent conversion to jet fuel in the first zone in accordance with the present invention. However, the exact amount of zeolite containing catalyst used in the first zone to obtain the specified 10 to 35 percent conversion to jet fuel in the first zone is a function of the processing conditions such as temperature and pressure and particularly is a function of the amount of organic nitrogen compounds in the feedstock. For feedstocks of comparable boiling ranges and other characteristics, the amount of catalyst required in the first zone is directly proportional to the amount of organic nitrogen compounds in the feedstocks.

In accordance with a preferred embodiment of the present invention, the first and second zones are contained in the same reaction vessel. It has been determined that high yields of jet fuels can be achieved by using a layered catalyst system which is composed of a zone of catalyst containing zeolites above a zone of amorphous hydrocracking catalyst. This embodiment of the present invention is particularly advantageous in that the two zones are contained in one common reaction vessel, as opposed to the added expense which results when the two zones are located in separate high-pressure reaction vessels. Thus, in certain instances, there is particular economic advantage in using one common reaction vessel for the two zones. However, in some cases, the highly selective and sensitive second zone catalyst is desirably protected from contaminants such as ammonia present in the effluent from the first zone and, in this case, overall advantage may lie in placing the first and second zones in separate reaction vessels, so that the effluent from the first zone can be readily treated before being fed to the second zone.

The process of the present invention is preferably applied to a gas oil boiling between about 450° and 1,000° F. and containing organic nitrogen contaminants. Gas oils boiling within the above-mentioned range can be converted to high yields of jet fuels in the process of the present invention. Also, the organic nitrogen contaminants are more easily converted over the zeolite catalyst in the first zone of the present invention to produce less harmful ammonia before reaching the second zone in the process of the present invention.

Operating conditions for the first zone and the second zone include a temperature between 600° and 900° F., preferably between 700° and 850° F.; a pressure between 500 and 10,000 p.s.i.g., preferably between 800 and 2,000 p.s.i.g.; and an LHSV between 0.5 and 5.0, preferably between 1.0 and 3.0. As indicated previously, these operating conditions are adjusted for the feedstock being processed so as to obtain the required 10 to 35 percent conversion to jet fuel in the first zone in accordance with the process of the present invention.

The catalyst used in the first zone in the process of the present invention is preferably made by dispersing zeolitic material in a matrix of coprecipitated Group VI and/or VIII metals or metal compounds, and siliceous cracking components such as silica with alumina. Contrasted to U.S. Pat. No. 3,287,252, the first zone catalyst containing zeolite is not fouled severely by aromatics. This is believed to be a result of the fact that the zeolite is dispersed in a nonzeolitic hydrocracking catalyst structure.

In accordance with a particularly preferred embodiment of the present invention, the hydrocarbon feedstock to the process of the present invention is contacted in the first zone with a catalyst comprising a dispersion of 1 to 70 parts by weight of a crystalline zeolitic molecular sieve of the ammonium or hydrogen form and substantially free of metals or metal compounds having catalytic activity for hydrogenation, in 30 to 99 parts by weight of a matrix composed of silica-alumina containing a minor proportion of an oxide of titanium, zirconium, thorium or hafnium, and intimately associated with 1 to 10 percent by weight of nickel or cobalt in the form of metal, metal sulfide or metal oxide, and 5 to 25 percent by weight of molybdenum or tungsten in the form of metal, metal sulfide or metal oxide.

The disclosure of my copending application, Ser. No. 749,836, filed Aug. 2, 1968 (now abandoned), relates to crystalline zeolitic molecular sieve hydrocracking catalysts and therefore is incorporated by reference in its entirety into the present specification. The application Ser. No. 749,836 relates to a substantially "unloaded" zeolite which is dispersed in a hydrocracking catalyst matrix. In the process of the present invention, the catalyst used in the first zone may contain either an unloaded or a loaded zeolite, but it is preferred to use an unloaded zeolite.

Other preferred catalysts for use in the first zone of the present invention are disclosed in my copending application, Ser. No. 757,430, filed Sept. 4, 1968, and the disclosure of that application is incorporated by reference in its entirety into the present patent application.

The catalyst used in zone 2 of the present invention is clearly distinguished from the catalyst use in the first zone in that the second zone catalyst is a nonzeolitic catalyst. Thus, the second zone catalyst is referred to herein as an amorphous catalyst to distinguish it from the highly crystalline character of the zeolitic component in the catalyst used in the first zone. The catalyst used in the second zone can be prepared by a variety of techniques, including impregnation and cogelation techniques, to produce a highly active hydrocracking catalyst comprising materials or compounds of materials selected from Group VI or VIII, or both of these groups, and a siliceous cracking component such as silica with alumina. Particularly preferred catalysts for use in the second zone of the present invention are catalysts produced by cogelation techniques, as these catalysts have been found to have high activity, good stability, and high selectivity for producing jet fuel boiling range hydrocarbons by hydrocracking heavier hydrocarbons under conventional hydrocracking conditions. Thus, particularly preferred catalysts for use in the second zone process of the present invention are those prepared in accordance with the process disclosed by U.S. Pat. Nos. 3,280,040 and 3,401,125. The disclosure of the two aforesaid patents is incorporated by reference into the present specification, particularly insofar as disclosure of these patents relates to the characteristics and preparation of cogelation catalysts. Still further, the disclosure of my patent application Ser. No. 756,396, filed Aug. 30, 1968, relating to cogelation catalysts is incorporated by reference into the present patent application.

EXAMPLES

The catalysts used in the examples reported below are as follows:

First zone catalyst (catalyst containing zeolite) is designated herein as catalyst A. Catalyst A had the following composition:

| Component | Wt. % of Total Catalyst |
|---|---|
| NiO | 9.2 |
| WO$_3$ | 22.7 |
| TiO$_2$ | 7.2 |
| Al$_2$O$_3$ | 27.0 |
| SiO$_2$ | 23.9 |
| Crystalline zeolitic molecular sieve, "Y" form | 10.0 |
| Total | 100.0 |

Catalyst A was prepared by the following steps, using sufficient quantities of the various starting materials to produce the above-indicated weight percentages of the components of the final catalyst:

1. An aqueous acidic solution was prepared, containing AlCl$_3$, TiCl$_4$, NiCl$_2$ and acetic acid;
2. Three alkaline solutions were prepared: (1) a sodium silicate solution; (2) a sodium tungstate solution; and (3) an ammonia solution containing sufficient excess ammonia so that upon combining the alkaline solutions with the acidic solution coprecipitation of all the metal-containing components of the two solutions would occur at a neutral pH of about 7.
3. The acidic and alkaline solutions were combined, and coprecipitation of all of the metal-containing components of the two solutions occurred at a pH of about 7, resulting in a slurry.
4. Linde sodium "Y" crystalline zeolitic molecular sieve in finely divided form was added to the slurry.
5. The molecular sieve-containing slurry was filtered to produce a molecular sieve-containing hydrogel filter cake, which was washed repeatedly with dilute ammonium acetate solution, to remove sodium and chloride ionic impurities from both the hydrogel and the molecular sieve contained therein.
6. The molecular sieve-containing hydrogel was dried in an air-circulating oven and then was activated in flowing air for 5 hours at 950° F.

The finished catalyst was characterized by a molecular sieve component substantially free of catalytic metals; that is, substantially all of the nickel, tungsten and titanium contained in the catalyst was located in the gel portion of the catalyst rather than in the molecular sieve component thereof.

The second zone catalyst (amorphous hydrocracking catalyst) is designated herein as catalyst B. Catalyst B was essentially the same as the first zone catalyst except that no crystalline zeolitic molecular sieve component was dispersed in the matrix of catalyst B. Catalyst B was produced by a cogelation procedure similar to that used in the production of the first zone catalyst (catalyst A).

Both the first and second zone catalysts were sulfided at a temperature of about 600° F. by contacting the catalyst in a stream of dimethyl disulfide and hydrogen.

The feed used to obtain the results of the examples below was a California straight-run gas oil having the following characteristics:

Boiling range: 500°–900° F.
Organic nitrogen: 3,000 p.p.m. calculated as nitrogen wt.
Gravity: 20° API
Aniline point: 130° F.

EXAMPLE 1

The above-mentioned gas oil was contacted with 130 cu. cm. of 8–16 mesh catalyst, as indicated in table I. The liquid hourly space velocity in each of the three runs summarized in table I was 0.8. The pressure was 2,500 p.s.i.g., the total gas rate was 10,000 standard cu. ft. hydrogen per barrel of feed, and the temperature was adjusted within the range of about 700° F. to 800° F. to give either 55 or 65 percent liquid volume conversion to material boiling below 550° F. The object of these test runs was to determine the selectivity of the catalysts when used separately and when used in two sequential zones.

TABLE I

| Catalyst | 130 cc. all catalyst B | 130 cc. all catalyst A | 65 cc. catalyst A above 65 cc. catalyst B |
|---|---|---|---|
| Conversion, LV percent below 550° F | 55, 65 | 55, 65 | 55, 65 |
| LV percent yield, 300–550° F. jet fuel | 46.5, 53 | 40, 44 | 46, 50 |

The results tabulated in table I above show that selectivity for producing jet fuel boiling range hydrocarbons is much better when using catalyst A ahead of catalyst B, as opposed to using simply the highly active catalyst A (zeolitic-type catalyst). Although catalyst B does give a slightly higher yield of jet fuel boiling range hydrocarbons all by itself than does the combined A and B catalyst sequence, it will become apparent from the following example that it is more advantageous to operate with the combined A and B catalytic sequence from an overall standpoint, most particularly because of overall fouling rate conditions.

As discussed under "Summary of the Invention," the zone 1 catalyst (A) can be operated in a reactor vessel separate from zone 2 catalyst (catalyst B). In certain instances, this will afford advantages in terms of removing certain hydrocarbon constituents and in removing contaminants, such as ammonia and/or $H_2S$, ahead of catalyst B. However, the above data show that a layer system of A over B catalyst operates very advantageously, even with a gas oil feed containing a substantial amount of nitrogen contaminant. Thus, a particularly preferred embodiment of the present invention is the embodiment wherein both the A and B catalysts are contained in one common reactor vessel.

EXAMPLE 2

The gas oil feed mentioned above was contacted at the same feed rate with catalyst B and with a similar total amount of A over B catalyst to give the results as tabulated in table II below. The operating pressure was set at 1,600 p.s.i.g. in both instances, the hydrogen rate was about 10,000 standard cubic feet per barrel of gas oil feed, and the conversion was 60 liquid volume percent.

TABLE II

| CATALYST: | Catalyst B | 50% Catalyst A over 50% Catalyst B |
| --- | --- | --- |
| Starting temp., °F. | 770 | 770 |
| Fouling rate, °F./hr. | 0.055 | 0.01 |

The results tabulated in table II show that the fouling rate for the B-type catalyst was considerably higher (by a factor of 5.5) than the fouling rate obtained when the catalyst system contained catalyst A ahead of catalyst B. Thus, the data illustrates that catalyst B, although it has a high selectivity for jet fuel boiling range hydrocarbons, does not have as great a stability as a similar catalyst containing crystalline zeolitic aluminosilicate as an added component. When operating in accordance with the process of the present invention, that is, with zeolitic catalyst over amorphous hydrocracking catalyst, a more advantageous process is achieved than when using only amorphous hydrocracking catalyst as the fouling rate is much lower for the combined catalytic system, even though the operation is at a comparable temperature, pressure and conversion to jet fuel boiling range hydrocarbons.

EXAMPLE 3

This example illustrates a particularly preferred embodiment of the present invention wherein the unconverted heavy portion of the effluent from the catalyst bed is recycled until all of the products from the catalytic hydrocracking operation are converted to jet fuel boiling range hydrocarbons or lighter hydrocarbons. The results from this operation are tabulated in table III below. The upper cut point for the jet fuel product in this instance was set at 525° F. The operating conditions included an LHSV of 1.0, a pressure between 1,300 and 1,600 p.s.i.g., a hydrogen gas rate of 7,800 standard cubic feet per barrel gas oil feed, and a conversion of 60 liquid volume percent.

TABLE III

| Catalyst | All catalyst B | All catalyst A | 50% catalyst A over 50% catalyst B |
| --- | --- | --- | --- |
| Yields of 300–525° F. jet fuel: | | | |
| Weight, percent | 58.4 | 49.6 | 57.9 |
| LV, percent | 64.7 | 55.8 | 65.4 |

The results as tabulated in table III above show that improved selectivity for producing jet fuel boiling range hydrocarbons is obtained in recycle hydrocracking operation when using a process in accordance with the present invention. As illustrated in table III above, for the zone 1 catalyst over zone 2 catalyst, about 65.4 liquid volume percent yield of jet fuel was obtained in the extinction recycle operation, versus 55.8 and 64.7 liquid volume percent jet fuel for catalyst A by itself and catalyst B by itself, respectively. Although catalyst B by itself at the same LHSV for the combined catalyst A ahead of catalyst B resulted in essentially comparable liquid volume yields of jet fuel, the fouling rate would be considerably higher for catalyst B operated by itself, as was illustrated by example 2 above.

Although various specific embodiments of the invention have been described and shown, it is to be understood they are meant to be illustrative only and not limiting. Certain features may be changed without departing from the spirit or essence of the invention. It is apparent that the present invention has broad application to producing jet fuel from a hydrocarbon feedstock boiling at least partly above the jet fuel range, using catalyst containing zeolite dispersed in gel hydrocracking catalyst component ahead of an amorphous hydrocracking catalyst. Accordingly, the invention is not to be construed as limited to the specific embodiments illustrated, but only as defined in the appended claims.

I claim:

1. A process for producing jet fuel from a hydrocarbon feedstock boiling at least partly above the jet fuel range, which comprises:
   a. Contacting the feedstock in a first zone at elevated temperature and pressure and in the presence of hydrogen, with a catalyst comprising a crystalline zeolitic molecular sieve dispersed in a nonzeotitic hydrocracking catalyst matrix, said matrix comprising at least an inorganic refractory support material and a Group VI or Group VIII metal or metal compound component;
   b. Operating the first one at conditions to obtain between 10 and 35 percent conversion of the feedstock to material boiling below the initial boiling point of the feedstock and above 300° F. and withdrawing an effluent comprising partially converted feedstock;
   c. Passing at least a portion of the first zone effluent to a second zone as second zone feedstock;
   d. Contacting said second zone feedstock in the second zone, at elevated temperature and pressure and in the presence of hydrogen, with an amorphous catalyst comprising metals or compounds of metals selected from Group VI or VIII or both of these groups, and a cracking component but with no zeolitic molecular sieve component; and
   e. Operating the second zone at conditions to obtain between 10 and 45 percent conversion of said second zone feedstock to material boiling below the initial boiling point of the feedstock and above 300° F.

2. A process in accordance with claim 1 wherein the cracking component of the second zone catalyst is a siliceous cracking component.

3. A process in accordance with claim 1 wherein the first zone and the second zone are contained in the same vessel.

4. A process in accordance with claim 1 wherein the hydrocarbon feedstock is a gas oil boiling between about 450° and 1,000° F., and containing organic nitrogen contaminants.

5. A process in accordance with claim 1 wherein both the first and second zones are operated at a temperature between 600° and 900° F., a pressure between 500 and 10,000 p.s.i.g., and the first zone contains from 10 to 50 volumes of zeolite-containing catalyst versus 90 to 50 volumes of amorphous hydrocracking catalyst in the second zone.

6. A process in accordance with claim 5 wherein in the first zone the hydrocarbon feedstock is contacted with a catalyst comprising a dispersion of 1 to 70 parts by weight of a crystalline zeolitic molecular sieve of the ammonium or hydrogen form and substantially free of metals or metal compounds having catalytic activity for hydrogenation, in 30 to 99 parts by weight of a matrix composed of silica-alumina containing a minor proportion of an oxide of titanium, zirconium, thorium or hafnium, and supporting or intimately associated with 1 to 10 percent by weight of nickel or cobalt in the form of metal, metal sulfide or metal oxide, and 5 to 25 percent by weight of molybdenum or tungsten in the form of metal, metal sulfide or metal oxide.

7. A process in accordance with claim 6 wherein in the second zone said portion of the first zone effluent is contacted with a catalyst comprising coprecipitated nickel, tungsten, or compounds thereof, and alumina and silica.

* * * * *